(12) United States Patent
Davidson-Chmielewski

(10) Patent No.: US 10,682,962 B2
(45) Date of Patent: Jun. 16, 2020

(54) CARGO CONTAINMENT SYSTEM FOR A VEHICLE

(71) Applicant: Dawn Davidson-Chmielewski, Hockley, TX (US)

(72) Inventor: Dawn Davidson-Chmielewski, Hockley, TX (US)

( * ) Notice: Subject to any disclaimer, the term of this patent is extended or adjusted under 35 U.S.C. 154(b) by 64 days.

(21) Appl. No.: 15/979,116

(22) Filed: May 14, 2018

(65) Prior Publication Data

US 2018/0339659 A1 Nov. 29, 2018

Related U.S. Application Data

(60) Provisional application No. 62/510,120, filed on May 23, 2017.

(51) Int. Cl.
| | |
|---|---|
| *B60R 5/04* | (2006.01) |
| *B60R 7/02* | (2006.01) |
| *B60N 2/60* | (2006.01) |
| *B60P 1/64* | (2006.01) |
| *B60R 11/00* | (2006.01) |
| *B60N 2/90* | (2018.01) |

(52) U.S. Cl.
CPC ............... *B60R 5/045* (2013.01); *B60R 5/04* (2013.01); *B60R 7/02* (2013.01); *B60N 2/6009* (2013.01); *B60N 2002/905* (2018.02); *B60P 1/6409* (2013.01); *B60R 2011/0036* (2013.01)

(58) Field of Classification Search
CPC ............ B60N 2/6009; B60N 2002/905; B60R 5/045; B60R 2011/0036; B60R 5/04; B60R 7/02; B60P 1/6409
See application file for complete search history.

(56) References Cited

U.S. PATENT DOCUMENTS 5,772,370 A * 6/1998 Moore .................... B60R 7/005
296/37.16

FOREIGN PATENT DOCUMENTS

DE 102004040361 A1 * 2/2006 ............. B60R 11/00

* cited by examiner

*Primary Examiner* — D Glenn Dayoan
*Assistant Examiner* — Melissa Ann Bonifazi
(74) *Attorney, Agent, or Firm* — Lewis & Reese, PLLC

(57) ABSTRACT

A cargo container configured to fit in a passenger vehicle is disclosed. Embodiments of the container is configured with attachments for attaching to the lip of the opening of a trunk or a hatchback, thereby sealing a substantial portion of the area of the opening. The sealing configuration effectively prevents contamination of the vehicle during loading of the container. Embodiments of the container may also include a lip configured to drape over the bumper of the vehicle during loading. Once loaded, the container may be closed and secured.

9 Claims, 3 Drawing Sheets

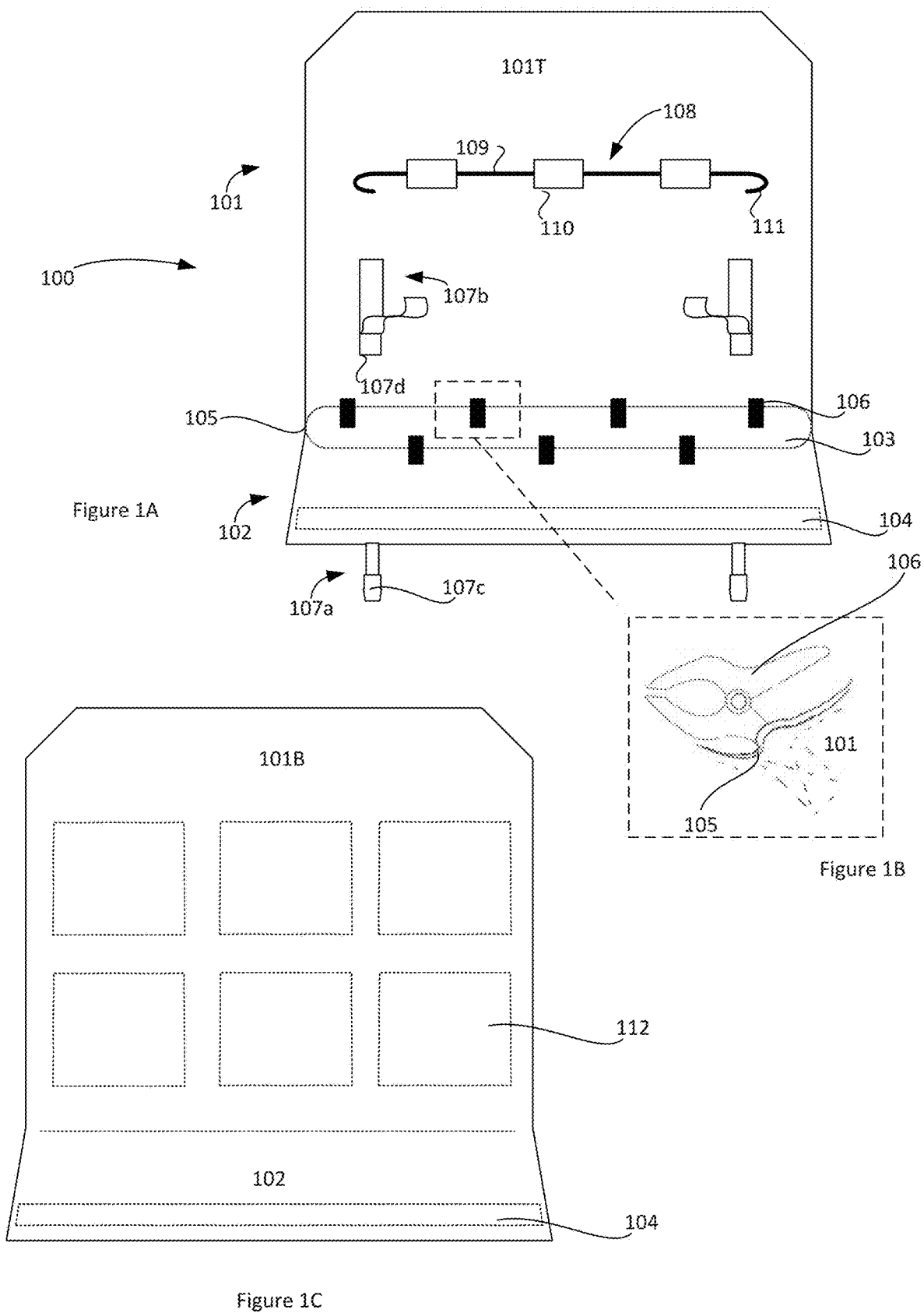

CARGO CONTAINMENT SYSTEM FOR A VEHICLE

CROSS REFERENCE TO RELATED APPLICATIONS

This is a non-provisional application of U.S. Provisional Patent Application Ser. No. 62/510,120, filed May 23, 2017, which is incorporated by reference in its entirety, and to which priority is claimed.

FIELD OF THE INVENTION

The present application relates to a cargo container for a vehicle.

BACKGROUND

Home owners, do-it-yourselfers, farmers, ranchers, and the like commonly have a need to transport cargo in a vehicle. Cargo, such as mulch, dirt, hay, bagged shavings, camping and hunting equipment, etc. can be difficult and messy to transport in an everyday use vehicle. Thus, there is a need for an apparatus that allows such cargo to be conveniently contained and transported in a sports utility vehicle (SUV) or in the trunk of a passenger car without damaging or dirtying the vehicle.

BRIEF DESCRIPTION OF THE DRAWINGS

FIG. 1A-1C shows an embodiment of a cargo container.

DESCRIPTION

Figure 2A:
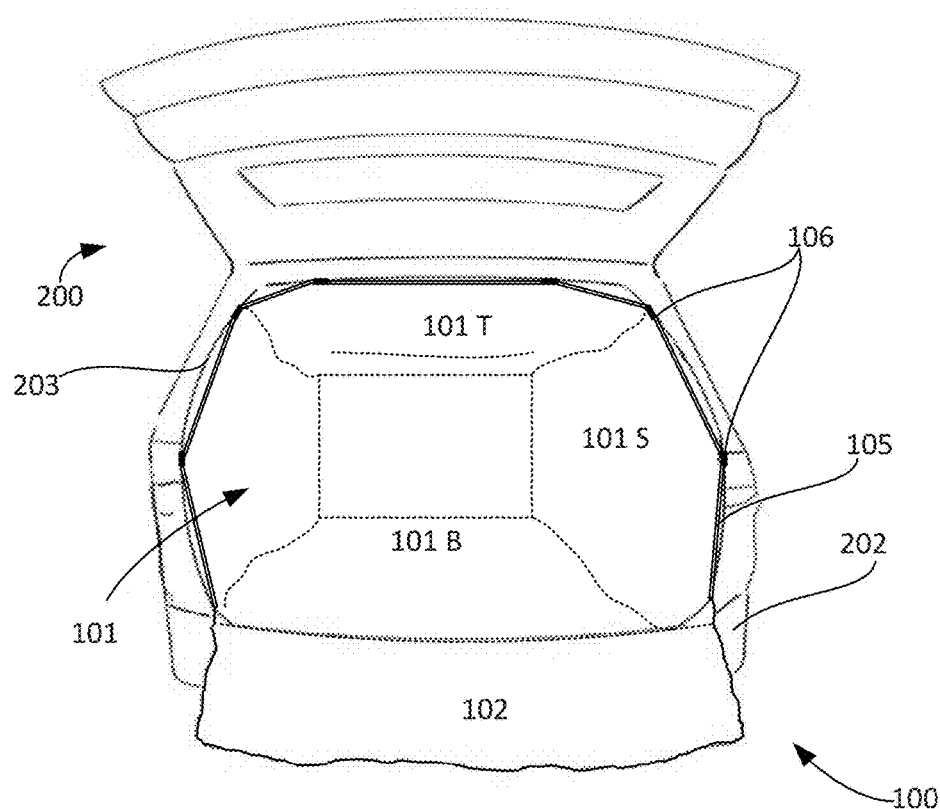
FIGS. 2A and 2B shows cargo containers installed within an SUV and within a passenger car, respectively in the loading/unloading configuration.

FIG. 1 shows an embodiment of a cargo container 100 for a car or SUV. The apparatus 100 comprises a pouch 101, a lip 102, and an opening 103. The pouch includes a top panel 101T (shown in FIG. 1A) and a bottom panel 101B (shown in FIG. 1C). The pouch may also include one or more side panels (not shown). The pouch 101 and lip 102 can be made of a waterproof, foldable material, such as polyethylene, vinyl, or weather-treated canvas, for example. Other materials will be apparent to a person of ordinary skill in the art in view of the disclosure. The pouch 101 is configured to install into the cargo area of an SUV or into the trunk of a passenger vehicle such that the volume of the pouch can expand to fill a substantial portion of the cargo area. The lip 102 is configured so that when the pouch is so installed, the lip can hang over the bumper of the vehicle, thereby keeping the bumper clean and directing cargo into the pouch portion when loading or unloading. According to some embodiments, the lip 102 may be configured with a weighting material 104. The weighting material may comprise sand, metal, or other material sewn into one or more pockets within the lip 102. The weighting material 104 serves to keep the lip weighted during use, preventing the lip from being blown away from the bumper by wind or being snagged as cargo is loaded into the pouch.

The edge 105 of the opening 103 is configured with a plurality of clips 106 that are adapted to clip to the vehicle into which the apparatus is installed. As explained in more detail below, the clips 106 can be configured to attach to the jamb or gasket of the SUV hatchback or trunk lid. An example clip 106 is illustrated in more detail in FIG. 1 B. The clips 106 can be sewn into the fabric of the pouch 101 or may be attached using rivets, hook and loop material, snaps, or the like. Alternatively, the clips 106 may be unattached to the pouch and may simply be used to clip the pouch to the vehicle. In such an embodiment, the pouch 101 may include a pocket for storing the clips when they are not in use.

According to some embodiments, the opening 103 of the pouch may be configured with gathers, elastic, a draw string, or the like so that the size of the opening can be adjusted to fit the circumference of different vehicles. For example, elastic may be sewn into the edge 105 of the opening 103.

According to some embodiments, the pouch 101 and/or lip 102 may include straps for securing the pouch closed once it is loaded with cargo. When closed, the lip 102 essentially becomes a lid for the pouch 101. The embodiment illustrated in FIG. 1 A includes compression straps 107a and 107b affixed to the lip 102 and the top panel 101T. Once the pouch 101 is loaded, a buckle 107c can be attached to a receiver 107d and straps 107a/107b can be tightened to secure the load and prevent debris from escaping. Other securing components, such as bungees, strings, or the like can be used instead or in addition.

In the embodiment illustrated in FIG. 1, the top panel 101T is configured with a expansion attachment 108. The expansion attachment 108 may be one or more straps 109, bungee cords, or the like that can be sewn into, or otherwise affixed to the top panel 101T. In the illustrated embodiment, the strap 109 is secured to the top panel 101T via loops 110 that are sewn or glued to the top panel. The strap(s) 109 may include hooks 111 configured to attach to the hanger hooks or front seat headrests of a vehicle, such as an SUV or hatchback car when the cargo container 100 is contained within the cargo compartment of the vehicle. The expansion attachment 108 serves to keep the pouch "open," i.e., to keep the top panel 101T elevated for easy cargo loading. The use of the support attachment is illustrated in FIG. 4, discussed below.

According to some embodiments, the bottom panel 101 B may include reinforcing structures 112 sewn into the panel. The reinforcing structures 112 help to keep the bottom panel 101 B lying upon the bottom of the vehicle and also provide structural stability to the bottom panel. The reinforcing structures 112 may be a rigid or semi-rigid material, such as a plastic or Styrofoam. The reinforcing structures 112 may be sewn into pockets in the bottom panel 101 B. Alternatively, the bottom panel 101 B may be constructed as a two-ply material and the reinforcing structures 112 may be sewn into, or otherwise affixed, between the plies. According to some embodiments, the reinforcing structures 112 are configured as multiple units so that the cargo container 100 can be easily folded when not in use.

FIG. 2A shows the cargo container 100 installed in the cargo compartment of an SUV 200 and configured for loading. As illustrated, the pouch 101 fills a substantial area of the cargo compartment and the lip 102 drapes over the bumper 202 of the SUV. The reinforcing structures and weighting material are omitted for clarity. Side panels 101 S are illustrated in FIG. 2 A, though it should be noted that embodiments of a cargo container 100 that do not include side panels are also contemplated. In such embodiments, the pouch is configured more as an envelope. The clips 106 secure the edge 105 of the pouch 101 to the jamb 203 of the cargo compartment at various locations about the circumference of the opening of the cargo compartment.

Once the cargo container 100 is loaded, the clips can be detached from the jamb 203 and the lip can be folded to cover the opening of the pouch, essentially becoming a lid for the pouch. Straps, if included, can be engaged to secure the cargo container closed. The cargo container 100 is thereby converted to its transport configuration.

FIG. 2 B shows the cargo container 100 installed in the trunk 211 of a passenger car 210. Again, the clips 106 secure the edge 105 of the pouch 101 to the jamb 213 of the trunk.

Figure 3:
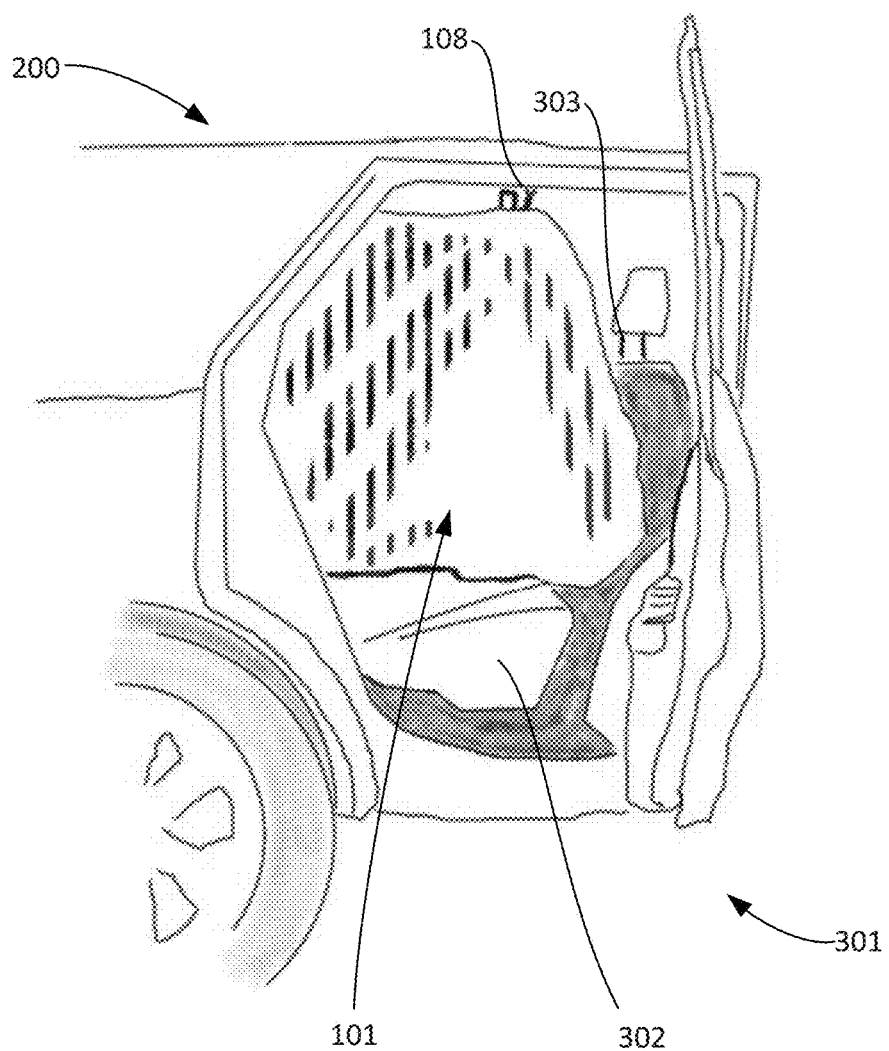
FIG. 3 shows a cargo container installed within an SUV.

FIG. 3 shows an SUV 200 with its rear passenger door 301 open so that the pouch 101 is visible. The rear seat 302 is folded down, as is common with SUVs, to increase the volume of the cargo compartment. The expansion attachment 108 is attached to the hanger hook (not visible) on each side of the cargo compartment. As apparent in FIG. 3, the expansion attachment could alternatively attach to the front seat headrests 303. Generally, any of the panels of the pouch 101 may include one or more expansion attachments configured to attach to any structure within the cargo compartment to keep the pouch expanded.

Figure 2B:
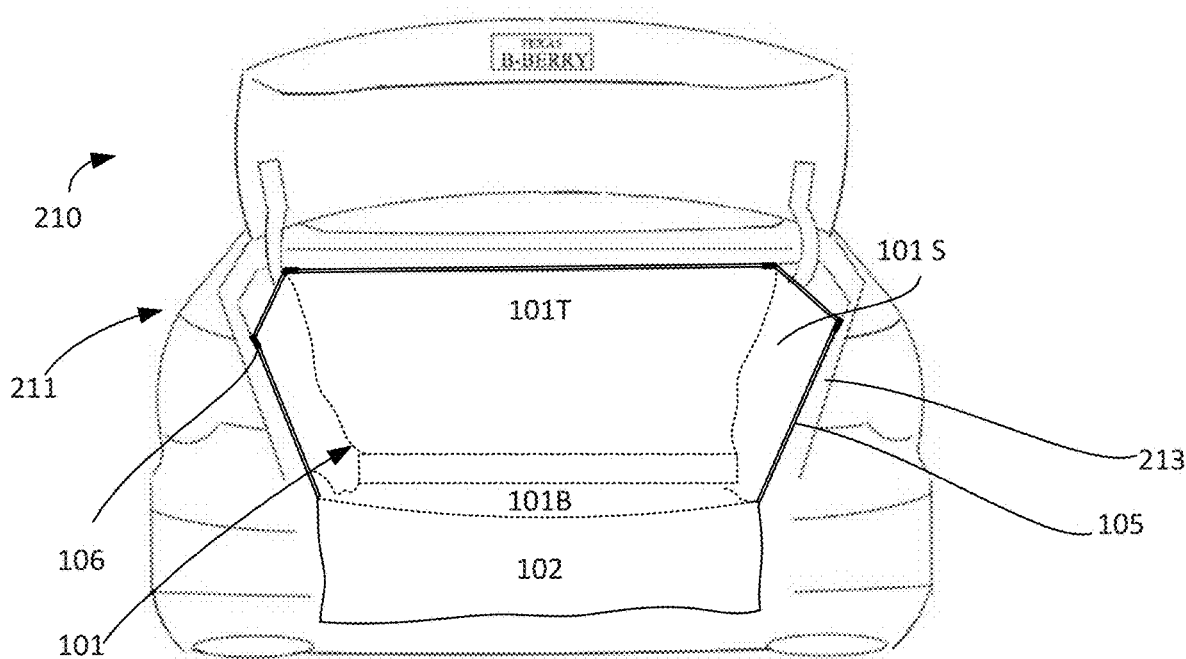

Several advantages of the disclosed cargo container will be apparent based on the disclosure. One advantage is that when the cargo container is being loaded or unloaded, the container substantially seals off the inside of the vehicle, thereby insuring that all the load is contained within the container. Referring to FIGS. 2A and 2B, the door opening to the cargo area of the SUV (FIG. 2A) and of the trunk of the car (FIG. 2B) each has a certain area. According to some embodiments, the cargo container 100 may effectively seal off up to 100% of the opening area. According to some embodiments, the container seals off up to 98% or 95% of the opening area. According to some embodiments, the cargo container 100 may seal off up to 90%, 85%, 80%, or 75% of the opening area. Once loaded and closed, the cargo container can substantially conform to the shape of the load.

The cargo container can be kept neatly folded and stored in the vehicle to use when needed. It is quickly installed and attached so that supplies and materials can be loaded into the vehicle. Once unloaded, the container can be removed from the vehicle, leaving the vehicle completely clean and debris free. The container can be shaken out, folded, and kept until needed again. If it is soiled, it can be turned inside out and hosed down. The cargo container can also be used to keep cargo dry and contained for transport in the back of a pickup truck or trailer. The cargo container can be sized to fit various types of vehicles.

While the invention herein disclosed has been described in terms of specific embodiments and applications thereof, numerous modifications and variations could be made thereto by those skilled in the art without departing from the scope of the invention set forth in the claims.

What is claimed is:

1. A cargo container comprising:
a pouch section,
an opening comprising an edge,
a plurality of clips,
a lip portion, and
one or more expansion attachments attached to the pouch section, wherein
the cargo container is configurable in a car-loading configuration, an SUV-loading configuration, and a transport configuration, wherein
in the car-loading configuration the cargo container is deployable in a trunk of a car such that the pouch section substantially fills the trunk, the plurality of clips attach the edge of the opening to a plurality of locations about a door jamb of the trunk to maintain the opening for loading, and the lip portion drapes over a bumper of the car,
in the SUV-loading configuration the cargo container is deployable in a cargo compartment of an SUV such that the plurality of clips attach the edge of the opening to a plurality of locations about a door jamb of the cargo compartment to maintain the opening for loading, the one or more expansion attachments attach to one or more locations within the cargo compartment to expand the pouch section within the cargo compartment, and the lip portion drapes over a bumper of the SUV, and
in the transport configuration the cargo container conforms to a shape of a load contained within the pouch section.

2. The cargo container of claim 1, wherein the plurality of clips is removably attached to the pouch.

3. The cargo container of claim 1, wherein the plurality of clips is permanently attached to the pouch.

4. The cargo container of claim 1, wherein the lip comprises a weighting material configured to weight the lip when the cargo container is in the car-loading configuration and in the SUV-loading configuration.

5. The cargo container of claim 1, further comprising one or more straps for securing the lid closed.

6. The cargo container of claim 1, wherein the bottom panel comprises one or more rigid reinforcing structures.

7. The cargo container of claim 1, wherein the edge comprises gathers.

8. The cargo container of claim 1, wherein the edge comprises an elastic material.

9. The cargo container of claim 1, wherein the edge comprises a drawstring.

\* \* \* \* \*